(12) United States Patent
Jeong

(10) Patent No.: US 7,396,238 B2
(45) Date of Patent: Jul. 8, 2008

(54) BATTERY CONTACT SYSTEM AND WIRELESS TERMINAL HAVING THE SAME

(75) Inventor: Jun-Young Jeong, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/246,448

(22) Filed: Oct. 6, 2005

(65) Prior Publication Data

US 2006/0073716 A1  Apr. 6, 2006

(30) Foreign Application Priority Data

Oct. 6, 2004 (KR) .................. 10-2004-0079645

(51) Int. Cl.
*H01R 4/58* (2006.01)

(52) U.S. Cl. ...................................... 439/86

(58) Field of Classification Search ............... 439/86, 439/76.1, 951, 81, 500, 929, 59, 95, 66, 91, 439/74, 225, 299, 352; 455/90, 450, 551, 455/575, 558; 174/35 GC, 35 R, 52.1
See application file for complete search history.

(56) References Cited

U.S. PATENT DOCUMENTS

| | | | | |
|---|---|---|---|---|
| 4,927,368 A | * | 5/1990 | Shino | .................. 439/66 |
| 5,092,788 A | * | 3/1992 | Pristupa et al. | ............. 439/225 |
| 5,427,535 A | * | 6/1995 | Sinclair | ................... 439/66 |
| 5,639,247 A | * | 6/1997 | Johnson et al. | ............... 439/74 |
| 5,697,070 A | * | 12/1997 | Liebler | .................. 455/575.1 |
| 5,910,025 A | * | 6/1999 | Mendolia | .................. 439/76.1 |
| 6,009,315 A | * | 12/1999 | De Larminat et al. | ....... 455/558 |
| 6,255,581 B1 | * | 7/2001 | Reis et al. | .................. 174/388 |
| 6,796,810 B2 | * | 9/2004 | DelPrete et al. | ............... 439/86 |

FOREIGN PATENT DOCUMENTS

| | | |
|---|---|---|
| EP | 1032079 A | 8/2000 |
| GB | 2071914 A | 9/1981 |
| JP | 10-144275 | 5/1998 |
| JP | 2002009912 A | 1/2002 |
| JP | 2003124396 Q | 4/2003 |
| JP | 2003157918 A | 5/2003 |

* cited by examiner

*Primary Examiner*—Edwin A. León
(74) *Attorney, Agent, or Firm*—Lee, Hong, Degerman, Kang & Schmadeka

(57) ABSTRACT

A wireless terminal reliably supplies battery power to a wireless terminal body, and reduces the number of fabrication processes and fabrication cost. The battery contact system of the wireless terminal includes a body having a printed circuit board, a battery compartment, a battery detachably accommodated in the battery compartment, and at least one connection unit for transmitting battery power the body. The connection unit is an insulated elastic body protruding from the battery compartment and encompassing flexible conductors within the insulated elastic body.

18 Claims, 5 Drawing Sheets

BATTERY CONTACT SYSTEM AND WIRELESS TERMINAL HAVING THE SAME

CROSS-REFERENCE TO RELATED APPLICATIONS

This application claims the benefit of the Korean Patent Application No. 10-2004-0079645, filed on Oct. 6, 2004, which is hereby incorporated by reference as if fully set forth herein.

FIELD OF THE INVENTION

The present invention relates to a wireless terminal, and more particularly, to a battery contact system for a wireless terminal capable of supplying battery power to the terminal body, capable of simplifying the fabrication processes, and capable of reducing the fabrication cost.

BACKGROUND OF THE INVENTION

Generally, a wireless terminal is a communication device for transmitting and receiving calls to and from another party anywhere as a user conveniently carries it. Previously, the wireless terminal has been used for voice communications only, but recently the wireless terminal is useful for transmitting and receiving multimedia information.

The wireless terminal is portable because the terminal has a battery for supplying power. In order to connect the battery and the terminal body to each other, the body and the battery are equipped with contacts. However, in case of an impact to the wireless terminal, the battery and terminal contacts may be disconnected thereby interrupting power to the wireless terminal.

FIG. 1 is a disassembled perspective view showing a battery of a wireless terminal in accordance with the conventional art, and FIG. 2 is a sectional view taken along line A-A of FIG. 1.

As shown, the conventional wireless terminal includes: a body 10; a battery 20 detachably mounted at the body and supplying power to the body; and a contact portion 30 for electrically connecting the body 10 and the battery 20 to each other.

The body 10 includes: a printed circuit board (PCB) 14 (shown on FIG. 2) mounted therein and having circuit components; a battery compartment 11 for mounting the battery 20; a folder 12 rotatably coupled to the outside of the body 10 and having a display (not shown); and an antenna 13 provided at one side thereof.

The PCB 14 receives an electric power from the battery 20 through the contact portions 30. The contact portions will be explained in greater detail below.

The battery compartment 11 is provided with a contact terminal 31 for contacting a corresponding flat metal terminal 36 on the battery 20 thereby transmitting power.

The battery compartment 11 is provided with an outer peripheral wall 45 protruding to a certain height along the circumference of the battery 20 in order to firmly fix the battery 20 to the body 10.

A coupling protrusion 41 partially inserted into a coupling groove 42 formed on the battery 20 is provided at the center of one side of the outer peripheral wall 45. Also, on the opposite side of the outer peripheral wall 45, a fixing groove 44 is provided for inserting a fixing protrusion 43 of the battery 20 thereby fixing a lower end of the battery 20.

The coupling protrusion 41 is mounted to the body 10 by a spring (not shown) so as to be easily inserted into the coupling groove 42 when attaching the battery 20 to/from the body 10. The coupling protrusion 41 is integrally formed with a coupling member 40.

The battery 20 is provided with flat metal terminals 36 on one side surface of the battery 20 for contacting the battery compartment 11. Also, the coupling groove 42 having a certain depth for inserting the coupling protrusion 41 formed at the body 10 is formed at the center of one edge of the battery 20 so as to couple the battery 20 to the body 10. Also, the fixing protrusion 43 protruded with a certain height to be inserted into the fixing groove 44 formed at the body 10, for fixing a lower end of the battery 20 to the body 10 is provided at both sides of a lower end of the battery 20.

As shown in FIG. 2, the contact portion 30 includes: a contact terminal 31 inserted into a contact accommodating hole 32 penetrating a case of the body 10 where the battery compartment 11 is formed; a retainer 37 circumferentially protruding at one end of the contact accommodating hole 32 preventing the contact terminal 31 from being detached from the contact accommodating hole 32; and an elastic spring 33 connected to one end of the contact terminal 31 for supporting the contact terminal 31.

A circumferential stopping protrusion 34 is formed for contacting the retainer 37 at one side of the contact terminal 31.

A lower end of the elastic spring 33 is fixed to the PCB 14 by a soldering portion 35, and the soldering portion 35 is connected to a PCB contact portion 15 of the PCB 14. The contact terminal 31, the elastic spring 33, the soldering portion 35 and the PCB contact portion 15 are formed of conductive material to be used for supplying power of the battery 20.

The conventional battery contact system of a wireless terminal will be explained as follows. When the battery 20 is coupled to the body 10, the fixing protrusion 43 formed on one surface of the battery 20 are inserted into the fixing groove 44 of the body 10 thereby fixing a lower end of the battery 20 to the body 10. Then, a rear surface of the battery 20 is attached to the body 10 thereby to insert the coupling protrusion 41 of the coupling member 40 to the coupling groove 42 formed on one surface of the battery 20.

As the battery 20 is coupled to the body 10, the metal terminal 36 of the battery 20 presses the contact terminal 31 into the body 10. As the result, the contact terminal 31 is inserted into the body 10 by the elastic spring 33 and is in point-contact with the metal terminal 36. As the contact terminal 31 and the metal terminal 36 are in contact with each other, battery power is supplied to the body 10. In the conventional battery contact system of a wireless terminal, the contact terminal 31 mounted at the body 10 is biased by the spring to be in point-contact with the metal terminal 36 mounted at the battery 20 thereby supplying power to the body 10.

However, when an impact is applied to the wireless terminal, the contact terminal 31 mounted at the body 10 may become detached from the metal terminal 36 by overcoming the bias of spring 33 thereby to interrupting power to the body 10.

Also, since the soldering portion 35 is used to connect the contact terminal 31 to the PCB contact portion 15, and the elastic spring 33 is biased to support the contact terminal 31, fabrication processes are complicated and the fabrication cost is increased.

SUMMARY OF THE INVENTION

Therefore, an object of the present invention is to provide a battery contact system of a wireless terminal capable of reliably supplying battery power to a wireless terminal, simplifying the fabrication process, and reducing fabrication cost.

To achieve these and other advantages and in accordance with the purpose of the present invention, as embodied and broadly described herein, there is provided a battery contact system of a wireless terminal comprising: a body having a printed circuit board therein and having a battery compartment at one surface thereof; a battery detachably accommodated in the battery compartment; and a connection unit for transmitting battery power to the body, wherein the connection unit comprises an insulated elastic body protruding from the battery compartment and a flexible conductor provided in the insulated elastic body and having one end exposed to outside of the insulated elastic body.

The insulated elastic body is inserted into a contact accommodation hole penetrating a body case where the battery compartment is formed.

The contact accommodation hole is provided with a retention groove for preventing the insulated elastic body from being detached from the contact accommodation hole at one end thereof. The insulated elastic body has a retention ledge formed on one end for mating with the contact accommodation hole retention groove.

One end of the flexible conductor is exposed on an upper outside of the insulated elastic body for contacting with battery a terminal, and another end of the flexible conductor is in contact with the printed circuit board.

The insulated elastic body is formed of silicon or rubber and may be constructed as a solid having flat upper and lower surfaces. The flat lower surface contacts the PCB, and the flat upper surface in contacts the battery terminal. The solid may be a cylinder, a prism, a regular truncated pyramid, a frustum, or a hemisphere.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Reference will now be made in detail to the embodiments of the present invention, examples of which are illustrated in the accompanying drawings. A wireless terminal according to the present invention will be explained in greater detail.

Figure 1:
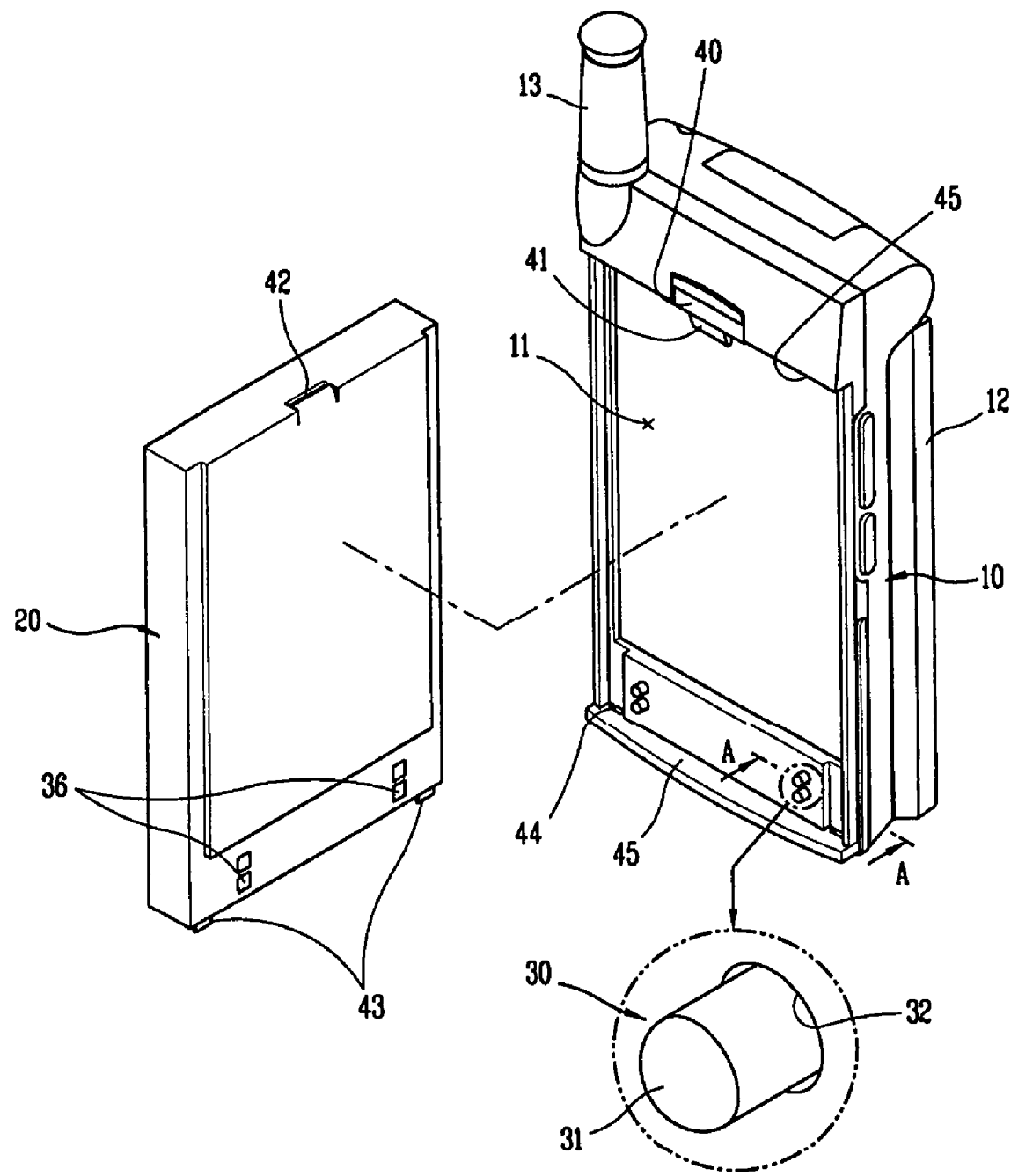
FIG. 1 is a disassembled perspective view showing a battery of a wireless terminal in accordance with the conventional art.
Figure 2:
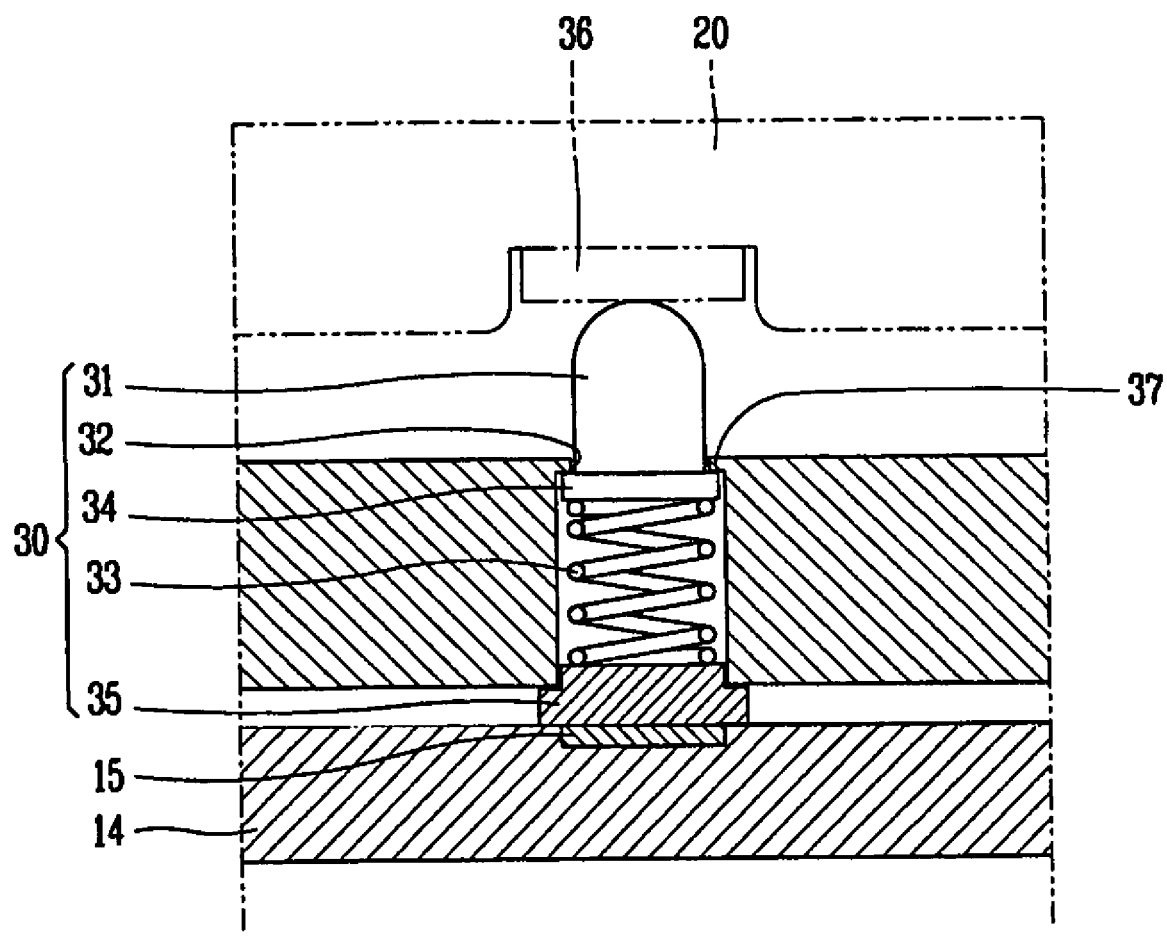
FIG. 2 is a sectional view taken along line A-A of FIG. 1.
Figure 3:
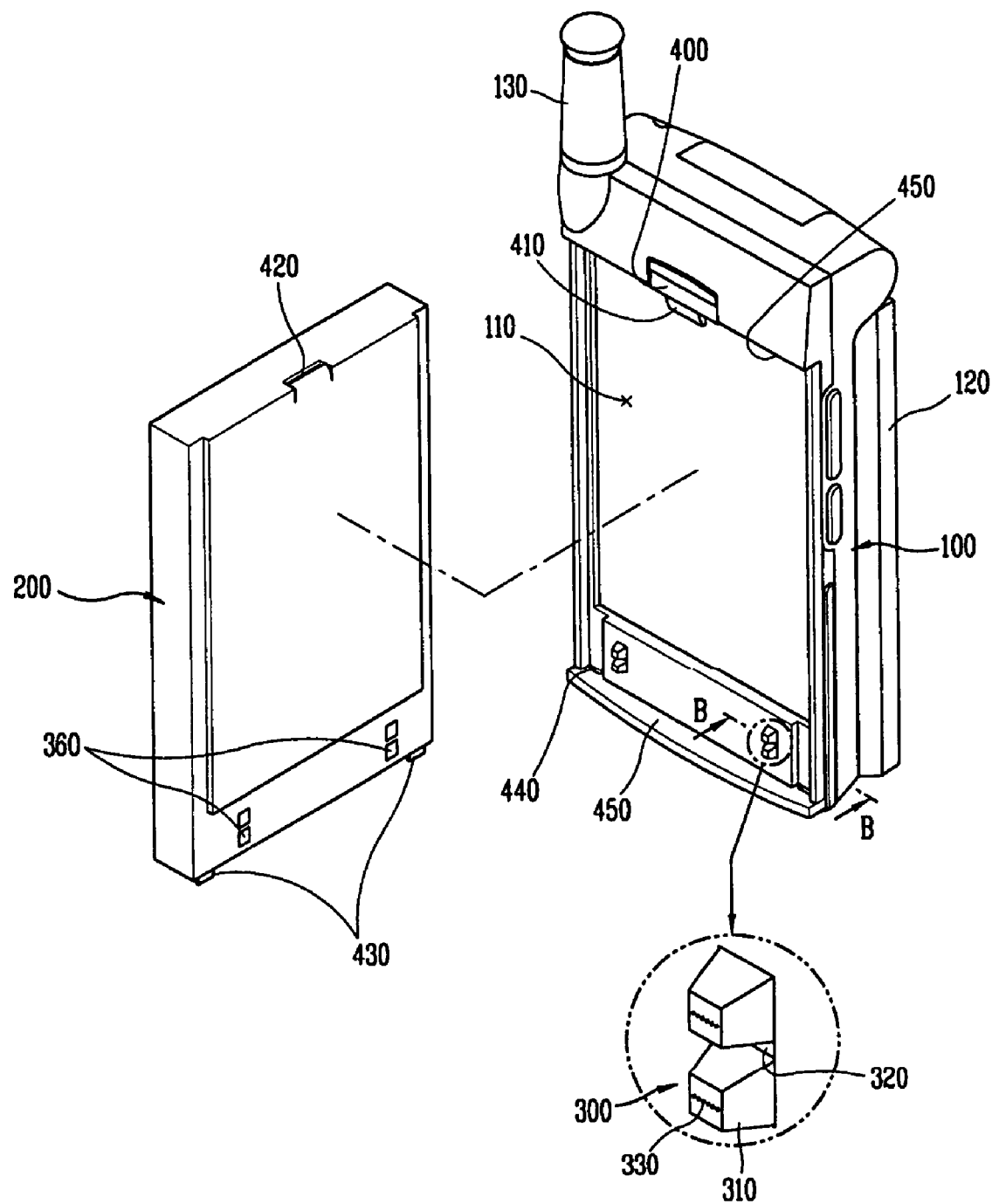
FIG. 3 is a disassembled perspective view of a battery of a wireless terminal according to the present invention.
Figure 4:
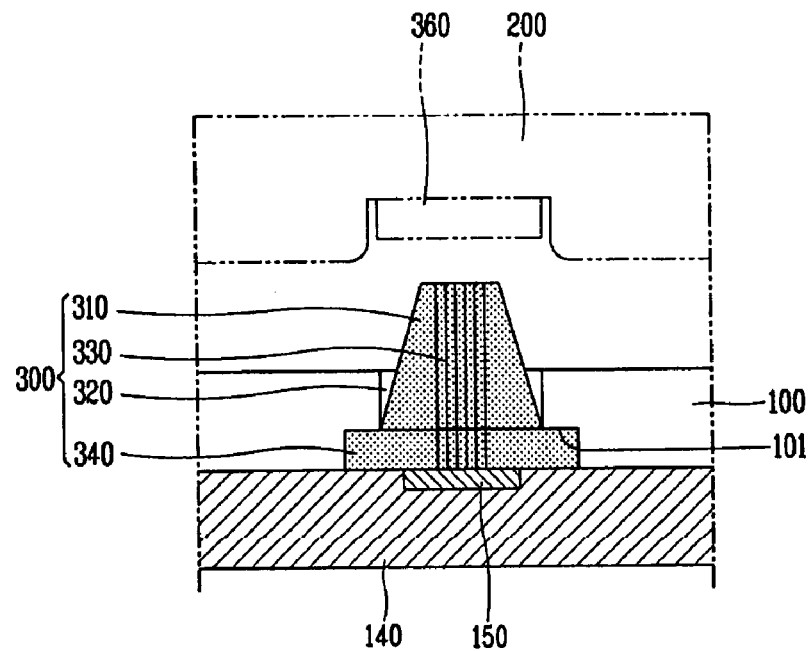
FIG. 4 is a sectional view taken along line B-B in FIG. 1.

FIG. 3 is a disassembled perspective view of a battery of a wireless terminal according to the present invention, and FIG. 4 is a sectional view taken along line B-B in FIG. 3.

As shown, a battery contact system of a wireless terminal according to the present invention comprises: a body 100 having a printed circuit board 140 (shown in FIG. 4) therein and having a battery compartment 110 at one surface thereof; and a battery 200 detachably mounted in the battery compartment 110, wherein a connection unit 300 includes an insulated elastic body 310 protruding from the battery compartment 110 and a flexible conductor 330 within the insulated elastic body 310 having one end exposed to the exterior of the insulated elastic body 310.

The body 100 includes: a printed circuit board PCB 140 mounted therein and having components necessary for a communication; a battery compartment 110 having a space for accommodating the battery 200; a folder 120 rotatably coupled to outside of the body 100 and having a display (not shown); and an antenna 130 provided at one side thereof.

The PCB 140 is connected to the battery 200 through at least two connection units 300 to receive power.

The insulated elastic bodies 310 protrude from the battery compartment 110 at positions corresponding to the metal terminals 360 formed on the battery 200, and transmit power to the body 100 by contact with the metal terminal 360. The insulated elastic body 310 is preferably formed in the same number as that of the metal terminals 360.

An outer peripheral wall 450 having a shape corresponding to the battery 200 protrudes from the battery compartment 110 at a certain height along the circumference of the battery compartment 110 for mounting the battery 200 to the body 100. A coupling protrusion 410 is partially inserted into the coupling groove 420 formed at the battery 200. Also, fixing grooves 440 are located at both sides the outer peripheral wall 450 for inserting a fixing protrusion 430 of the battery 200 thereby fixing a lower end of the battery 200.

As shown in FIG. 4, the insulated elastic body 310 of the connection unit 300 is inserted into a contact accommodation hole 320 penetrating a case of the body 100 where the battery compartment 110 is formed. The flexible conductor 330 is provided in the insulated elastic body 310, and is mounted so that one end is exposed to outside of the insulated elastic body 310.

The contact accommodation hole 320 is provided with a retention groove 101 for preventing the insulated elastic body 310 from being detached from the contact accommodation hole 320. The insulated elastic body 310 has a retention ledge 340 formed on one end for mating with the contact accommodation hole retention ledge 340. The shape of the contact retention hole 320 and the shape of the insulated elastic body 310 may cooperate to retain the insulated elastic body 310 in the contact retention hole 320 when the body 100, the PCB 140 and the insulated elastic body 310 are assembled.

The connection unit 300 may be a component the body 100 as shown in one embodiment, but alternatively may be a component of the battery 200. Also, the connection unit 300 may be a component of each the body 100 and the battery 200.

Preferably the insulated elastic body 310 is formed as a regular truncated pyramid having a rectangular base. The insulated elastic body 310 may have other shapes such as a cylinder, a prism, a frustum (a truncated cone), or a portion of a sphere. The insulated elastic body 310 is preferably formed of silicon or rubber having an elastic characteristic and capable of absorbing impact by itself. The truncated portion of the pyramid, or the top of the pyramid, securely contacts the metal terminal of the battery 360 when the insulated elastic body 310 is deformed by securely mounting the battery 200 in the battery compartment 110.

One end of the flexible conductor 330 is exposed on an upper outside of the insulated elastic body 310 for contacting with a battery terminal 360, and the other end of the flexible conductor 330 is in contact with a contact portion 150 of the PCB 140.

Figure 5:
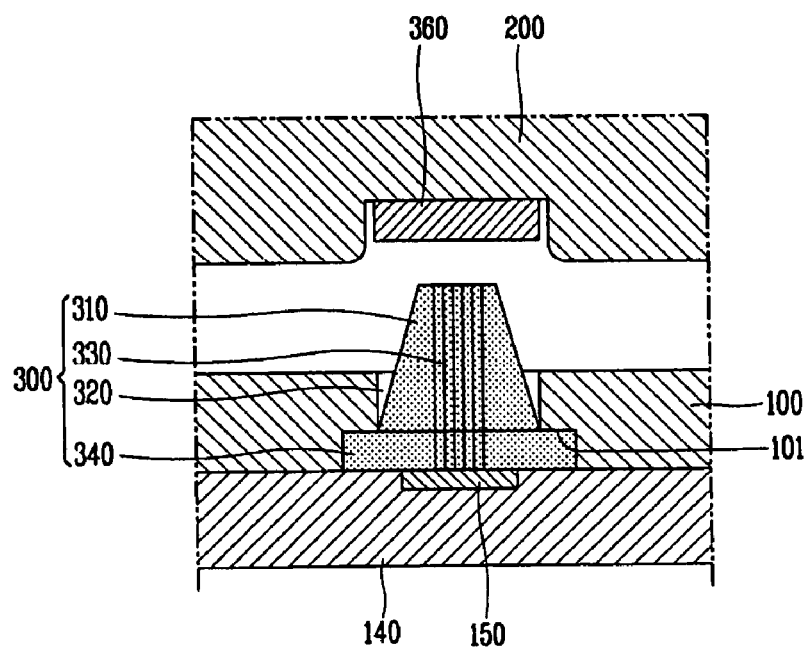
FIG. 5 is a view showing a state prior to coupling a battery to the body.
Figure 6:
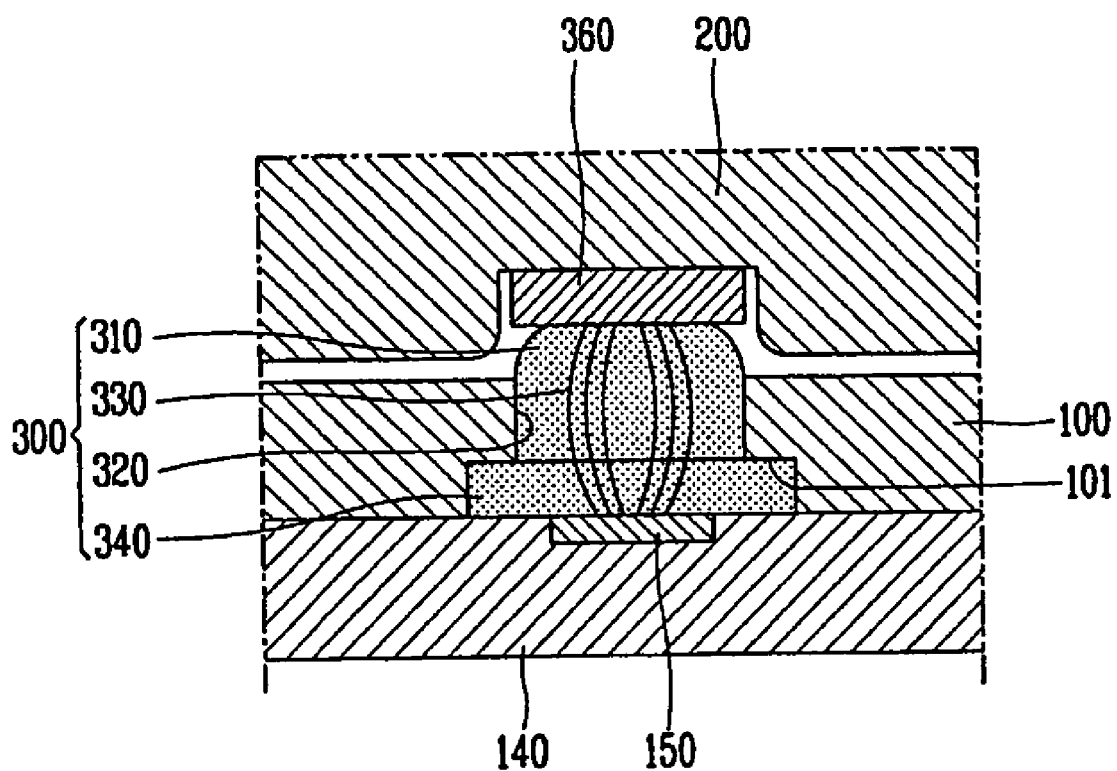
FIG. 6 is a view showing a state after coupling the battery to the body.

FIGS. 5 and 6 are sectional views showing the battery contact system of a wireless terminal according to the present invention, in which FIG. 5 is a view showing a state prior to coupling a battery to a body, and FIG. 6 is a view showing a state after coupling the battery to the body.

As shown, before the insulated elastic body 310 is in contact with the metal terminal 360 of the battery 200, the insulated elastic body 310 has a lateral section of a trapezoid shape and has the flexible conductor 330 therein, the flexible conductor of which lower end is in contact with the PCB contact portion 150 and upper end is exposed to exterior of the insulated elastic body 310.

When the battery 200 is mounted to the body 100, the fixing protrusion 430 formed at a lower end of the battery 200 is inserted into the fixing groove 440 formed at one side of the outer peripheral wall 450 of the body 100 thereby to fix the lower end of the battery 200, and then the battery 200 is inclined towards the rear surface of the body 100 to be gradually contact the body 100. Accordingly, the insulated elastic body 310 protruded at one side of the battery compartment 110 is in contact with the metal terminal 360 and gradually compresses the insulated elastic body 310.

A shown in FIG. 6, the top surface of the insulated elastic body 310, being pressed by the metal terminal 360, expands to be in contact with the inner wall of the contact accommodation hole 320. Accordingly, the insulated elastic body 310 height decreases, and the upper end of the flexible conductor 330 contacts the metal terminal 360 of the battery 200, and the lower end is in contacts the PCB contact portion 150.

When the battery 200 is detached from the body 100, the metal terminal 360 of the battery 200 is separated from the insulated elastic body 310. At the same time, the insulated elastic body 310 is restored to the original shape because the insulated elastic body 310 has an elastic characteristic.

According to the present invention, the insulated elastic body 310 can reliably maintain contact with the battery metal terminal 360 and the PCB 340 since the insulated elastic body is in compression. Accordingly, an impact to the terminal body will not cause a separation of the electrical contacts, and a subsequent power interruption is prevented. Also, whereas the conventional connection is soldered to the PCB, the insulated elastic body 310 of the present invention is only inserted into the contact accommodation hole 320 formed on the body 100 thereby simplifying the fabrication process and reducing fabrication costs.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A battery contact system comprising:
   a body having a printed circuit board therein and having a battery compartment on one surface thereof;
   a battery detachably accommodated in the battery compartment; and
   at least one connection unit for transmitting battery power to the body, wherein each connection unit comprises an insulated elastic body protruding from the battery compartment and a flexible conductor provided within the insulated elastic body and having one end exposed to exterior of the insulated elastic body for contacting with the battery,
   wherein the insulated elastic body is inserted into a contact accommodation hole located within the body where the battery compartment is formed,
   wherein the insulated elastic body is compressed by direct contact with the battery when the battery is inserted into the battery compartment, and
   wherein when the insulated elastic body is compressed, the insulated elastic body expands to be in contact with an inner wall of the contact accommodation hole.

2. The system of claim 1, wherein one end of the flexible conductor is exposed to an upper surface of the insulated elastic body for contacting with a battery terminal, and another end of the flexible conductor contacts the printed circuit board.

3. The system of claim 1, wherein the insulated elastic body is formed of silicon or rubber.

4. The system of claim 1, wherein the contact accommodation hole is provided with a retention groove thereby preventing the insulated elastic body from being detached from the contact accommodation hole.

5. The system of claim 4, wherein the insulated elastic body is a cylinder, a regular prism, a frustum, a truncated regular pyramid, or a hemisphere.

6. The system of claim 5, wherein a retention ledge is formed as part of the insulated elastic body for mating with the contact accommodation hole retention groove.

7. A wireless terminal comprising:
   a terminal body having a printed circuit board therein and having a battery compartment at one surface thereof;
   a battery detachably accommodated in the battery compartment; and
   at least one connection unit for transmitting battery power to the terminal body, wherein each connection unit comprises an insulated elastic body protruding from the battery compartment and a flexible conductor provided within the insulated elastic body and having one end exposed to exterior of the insulated elastic body for contacting with the battery,
   wherein the insulated elastic body is inserted into a contact accommodation hole located within the body where the battery compartment is formed,
   wherein the insulated elastic body is compressed by direct contact with the battery when the battery is inserted into the battery compartment, and
   wherein when the insulated elastic body is compressed, the insulated elastic body expands to be in contact with an inner wall of the contact accommodation hole.

8. The wireless terminal of claim 7, wherein one end of the flexible conductor is exposed to an upper surface of the insulated elastic body for contacting with a battery terminal, and another end of the flexible conductor contacts the printed circuit board.

9. The wireless terminal of claim 7, wherein the insulated elastic body is formed of silicon or rubber.

10. The wireless terminal of claim 7, wherein the contact accommodation hole is provided with a retention groove thereby preventing the insulated elastic body from being detached from the contact accommodation hole.

11. The wireless terminal of claim 10, wherein the insulated elastic body is a cylinder, a regular prism, a frustum, a truncated regular pyramid, or a hemisphere.

12. The wireless terminal of claim 11, wherein a retention ledge is formed as part of the insulated elastic body for mating with the contact accommodation hole retention groove.

13. A battery connection terminal for connecting a wireless terminal with a detachable battery, the battery connection terminal comprising:
    an insulated elastic body, and
    at least one flexible conductor disposed within the insulated elastic body, wherein the insulated elastic body is disposed within a body of the wireless terminal and connects with the detachable battery disposed in a battery compartment of the wireless terminal body,
    wherein the insulated elastic body is inserted into a contact accommodation hole penetrating the wireless terminal body located where the battery compartment is formed,
    wherein the insulated elastic body is compressed by direct contact with the battery when the battery is inserted into the battery compartment, and
    wherein when the insulated elastic body is compressed, the insulated elastic body expands to be in contact with an inner wall of the contact accommodation hole.

14. The battery connection terminal of claim 13, wherein one end of the flexible conductor is exposed to an upper surface of the insulated elastic body for contacting with a battery terminal, and another end of the flexible conductor contacts a printed circuit board disposed in the wireless terminal body.

15. The battery connection terminal of claim 13, wherein the insulated elastic body is formed of silicon or rubber.

16. The battery connection terminal of claim 13, wherein the contact accommodation hole is provided with a retention groove thereby preventing the insulated elastic body from being detached from the contact accommodation hole.

17. The battery connection terminal of claim 16, wherein the insulated elastic body is a cylinder, a regular prism, a frustum, a truncated regular pyramid, or a hemisphere.

18. The battery connection terminal of claim 17, wherein a retention ledge is formed as part of the insulated elastic body for mating with the contact accommodation hole retention groove.

* * * * *